(12) United States Patent
Schulze et al.

(10) Patent No.: US 8,690,103 B2
(45) Date of Patent: Apr. 8, 2014

(54) METHOD AND APPARATUS FOR CONVERTING AIRCRAFT FROM COMMERCIAL TO MILITARY FREIGHT SERVICE

(75) Inventors: Greg Schulze, Jamestown, ND (US); Jeff Werbelow, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 639 days.

(21) Appl. No.: 12/987,566

(22) Filed: Jan. 10, 2011

(65) Prior Publication Data

US 2011/0176903 A1 Jul. 21, 2011

Related U.S. Application Data

(60) Provisional application No. 61/296,398, filed on Jan. 19, 2010.

(51) Int. Cl.
*B64D 9/00* (2006.01)

(52) U.S. Cl.
USPC .................... 244/137.1; 244/118.1

(58) Field of Classification Search
USPC ....................... 244/118.1, 118.2, 137.1, 129.1
See application file for complete search history.

(56) References Cited

U.S. PATENT DOCUMENTS

| | | | | |
|---|---|---|---|---|
| 3,899,092 A * | 8/1975 | Nordstrom | | 410/87 |
| 4,000,870 A * | 1/1977 | Davies | | 410/92 |
| 4,077,590 A * | 3/1978 | Shorey | | 410/77 |
| 4,134,345 A * | 1/1979 | Baldwin et al. | | 410/70 |
| 4,807,735 A * | 2/1989 | Huber | | 193/35 B |
| 4,929,133 A * | 5/1990 | Wiseman | | 410/52 |
| 4,989,809 A * | 2/1991 | Arnold | | 244/137.1 |
| 5,097,565 A | 3/1992 | Shorey | | |
| 5,140,716 A * | 8/1992 | Rawdon et al. | | 14/71.1 |
| 5,316,242 A * | 5/1994 | Eilenstein-Wiegmann et al. | | 244/137.1 |
| 5,346,161 A * | 9/1994 | Eilenstein-Wiegmann et al. | | 244/137.1 |
| 5,370,342 A * | 12/1994 | Nordstrom | | 244/118.1 |
| 6,557,800 B2 | 5/2003 | Medina et al. | | |
| 6,604,258 B2 | 8/2003 | Saggio et al. | | |
| 6,817,578 B1 * | 11/2004 | Garcia et al. | | 244/137.1 |
| 7,086,517 B2 | 8/2006 | Clos et al. | | |
| 2004/0245397 A1* | 12/2004 | Garcia et al. | | 244/137.1 |
| 2009/0324356 A1* | 12/2009 | Schulze et al. | | 410/54 |
| 2011/0215198 A1* | 9/2011 | Panzram et al. | | 244/118.1 |

\* cited by examiner

*Primary Examiner* — Benjamin P Lee
(74) *Attorney, Agent, or Firm* — Cantor Colburn LLP

(57) ABSTRACT

A method and apparatus for converting aircraft from civilian cargo to CRAF use includes a pallet guide attached to the cargo deck of the aircraft. The pallet guide includes a pair of L-shaped structural channel members that are arranged back-to-back and staggered longitudinally along the length of the aircraft cargo deck. The L-shaped guide members are staggered back-to-back to enable military 463 L pallets to be guided along both the port and starboard sides of the pallet guide with one row of pallets loaded transverse to the centerline and one row of pallets loaded parallel to the centerline. The pallet guide includes a third guide member comprising a substantially T-shaped body displaced laterally with respect to the L-shaped guide members. For loading and unloading standard commercial pallets, the L-shaped guide members are rotated into a retracted position below the deck height of the cargo deck. The T-shaped guide member are then be moved from a retracted position below the deck height to a deployed position to engage the edges of the commercial pallets.

6 Claims, 5 Drawing Sheets

METHOD AND APPARATUS FOR CONVERTING AIRCRAFT FROM COMMERCIAL TO MILITARY FREIGHT SERVICE

CROSS-REFERENCE TO RELATED APPLICATIONS

This application claims the benefit of U.S. provisional application No. 61/296,398, filed Jan. 19, 2010.

BACKGROUND OF THE INVENTION

The present invention relates to the field of aviation and more particularly to an aircraft cargo handling system.

Commercial aircraft cargo handling systems have traditionally been designed to take advantage of standardized cargo containers and pallets. These standardized containers and pallets are often referred to as unit load devices or ULD's. ULD containers are closed containers typically made of aluminum with a base having rectangular dimensions with a lip sized to fit between a pair of standard width guide rails within the aircraft cargo hold. One example of a ULD container is an AMJ container, which is a contoured main deck container having base dimensions of 96 inches wide by 125 inches long, with a height of 96 inches.

ULD pallets are typically formed from an aluminum skin covering a lightweight core. ULD pallets have rectangular dimensions standardized to fit between the same guide rails in the aircraft hold as a corresponding ULD container. One example of a ULD pallet is known as a Code M pallet, which is a rectangular sheet 96 inches wide by 125 inches long.

The United States Department of Defense has also adopted a cargo handling system that utilizes standardized pallets. The Air Force cargo handling system is known as "Materials Handling Support System 463L" or simply "463L System." The standard pallet used in the 463L system is known as the HCU-6/E pallet and measure 88 inches wide by 108 inches long and is 2¾ inches thick. The edges of the pallet have a castellated or "sawtooth" edge where there is a 3 inch gap in the guide surface approximately every 15 inches. This is in contrast to commercial pallets, which have smooth edges on all sides.

Aircraft that participate in the Civil Reserve Air Fleet (CRAF) must be readily convertible from carrying standard ULD pallets such as the Code M pallet to carrying the Air Force's 463L pallets. Unfortunately, the castellated edge of the 463L pallet is often incompatible with the center guides on wide-body aircraft. This is because the center guides utilize relatively short, T-shaped guide posts which can fall into and catch on the 3 inch gaps in the 463L pallet edge. Additionally, the shorter width of the 463L pallet means that there is substantial wasted space along the sides and/or down the center between the rows of pallets in the cargo hold. Accordingly, a significant benefit could be gained if Air Force 463L pallets could be loaded asymmetrically so that one row of pallets is loaded with the long dimension parallel to the airframe and a second row loaded adjacent the first row with the long axis of the pallets perpendicular to the axis of the aircraft. Although it would be possible to remove and replace the center guide system each time the aircraft were converted from civilian to CRAF use, the reconfiguration would render this approach impractical. Many operators would prefer to leave the center guide system installed to avoid the time and labor necessary to remove and replace the hardware.

SUMMARY OF THE INVENTION

The present invention comprises a method and apparatus for converting aircraft from civilian cargo to CRAF use.

According to an illustrative embodiment of the invention, the apparatus comprises a pallet guide attached to the cargo deck of the aircraft. The pallet guide includes a pair of inverted L-shaped structural channel members that are arranged back-to-back and staggered longitudinally along the length of the aircraft cargo deck. The L-shaped structural channel members have a length dimension that is longer than the notches of the castellations of a standard military 463 L pallet so that the pallet cannot catch in the pallet guide. The L -shaped guide members are staggered back-to-back to enable the 463 L pallets to be guided along both the port and starboard sides of the pallet guide. In the illustrative embodiment, the pallet guide further includes a third guide member comprising a substantially T-shaped body displaced laterally with respect to the L-shaped guide members. For loading and unloading standard commercial pallets, the L-shaped guide members are rotated into a retracted position below the deck height of the cargo deck. The T-shaped guide member are then be moved from a retracted position below the deck height to a deployed position to engage the edges of the commercial pallets.

According to the inventive method, a plurality of 463 L pallets are loaded onto an aircraft so that the lower edges of the 463 L pallets abut the L-shaped guide members. Because the L-shaped guide members are offset laterally with respect to the center line of the aircraft cargo deck, one row of 463 L pallets is loaded crosswise with the longitudinal axes of the pallets transverse to the longitudinal axis of the cargo deck and a second row is loaded lengthwise with the longitudinal axes of the pallets aligned with the longitudinal axis of the aircraft cargo deck. This arrangement maximizes the number of 463 L pallets that can be loaded onto the cargo deck. The inventive method further includes unloading the 463 L pallets, moving the L-shaped guide members from the deployed position to the retracted position, moving the third guide members from the retracted position to the deployed position and thereafter loading a plurality of commercial pallets onto the aircraft with the lower edges of the commercial pallets abutting the port and starboard sides of the T-shaped third guide members.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
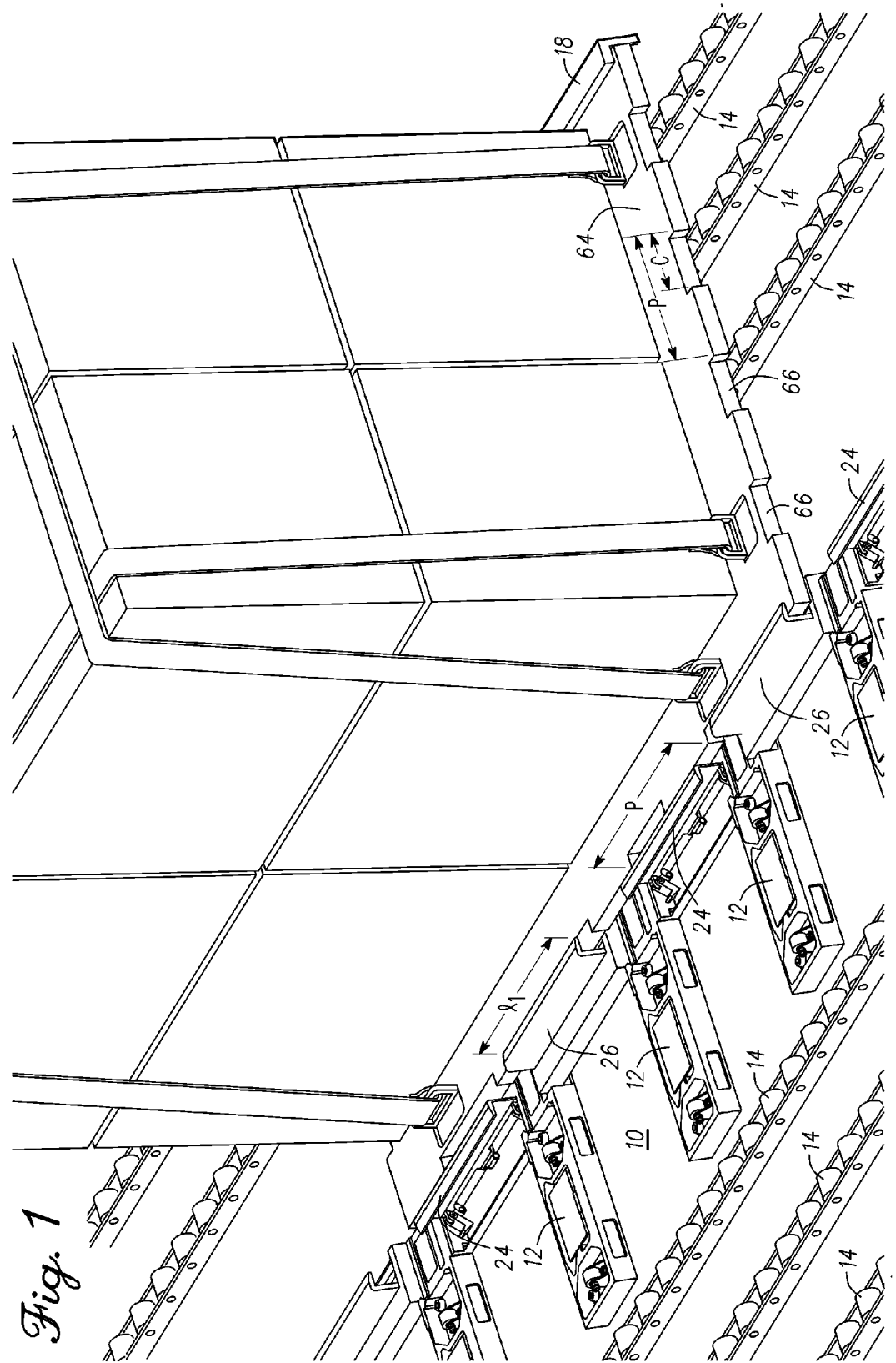
FIG. 1 is a perspective view of an aircraft cargo deck having a pallet guide incorporating features of the present invention with a 463 L pallet loaded.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention. Additionally, as used herein, unless otherwise specifically defined, the terms "substantially" or "generally" when used with mathematical concepts or measurements mean within ±10 degrees of angle or within 10 percent of the measurement, whichever is greater.

With reference to FIGS. 1-5 and in particular, FIG. 1, an aircraft cargo deck 10 includes a plurality of pallet guides 12 incorporating features of the present invention. Aircraft cargo deck 10 further includes a plurality of conventional linear roller tracks 14 as well as a plurality of caster plates 16 adapted to facilitate the movement of heavy cargo pallets on and off the aircraft cargo deck 10. As with prior art cargo handling systems, pallets are loaded onto the aircraft cargo deck through the cargo door (not shown) proximal the caster plate 16. The caster plates 16 enable the pallets to be rotated and aligned with the linear roller tracks 14 and edge guides 18. The pallets are then loaded onto the aircraft cargo deck 10 by moving them linearly along the linear roller tracks 14 with the edge guide 18 and the center guides (discussed more fully hereinafter) restraining the pallet against vertical motion.

Figure 4:
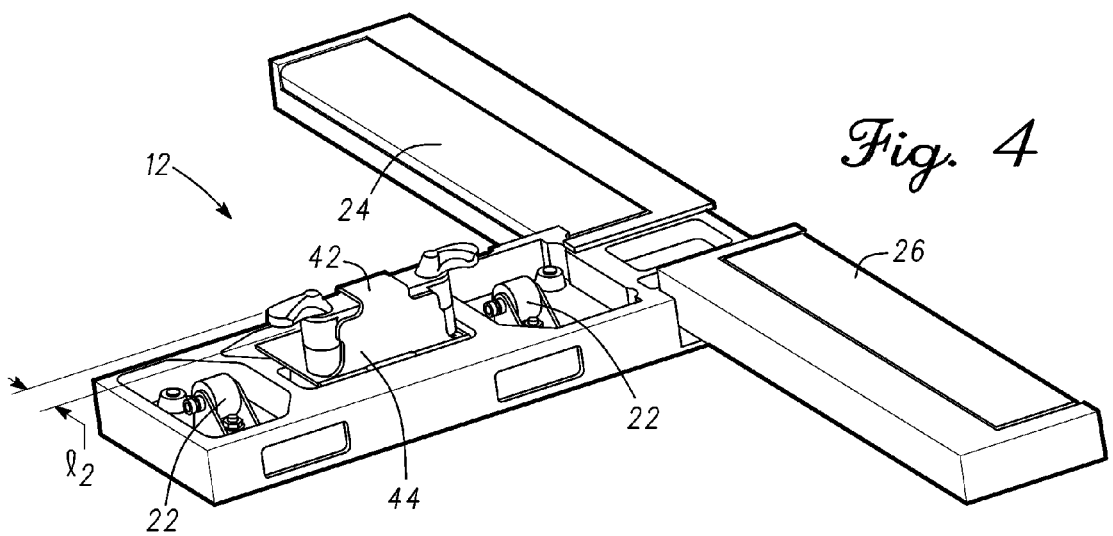
FIG. 4 is a perspective view of a pallet guide incorporating features of the present invention with the L-shaped guide members in the retracted position and the T-shaped guide member in the deployed position.
Figure 5:
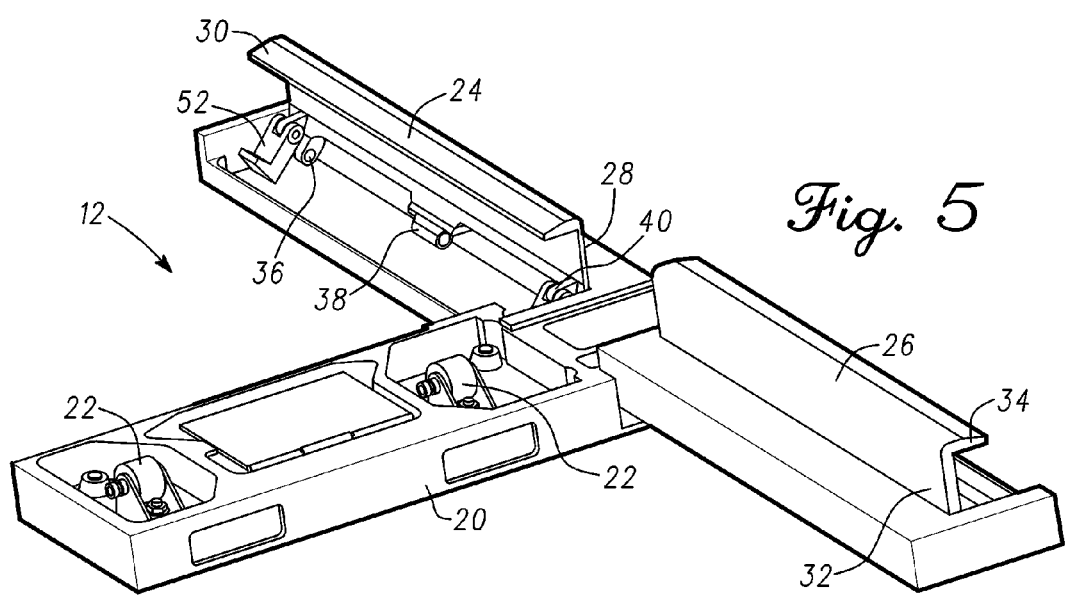
FIG. 5 is a perspective view of a pallet guide incorporating features of the present invention with the T-shaped guide member in the retracted position and the L-shaped guide members in the deployed position.
Figure 6:
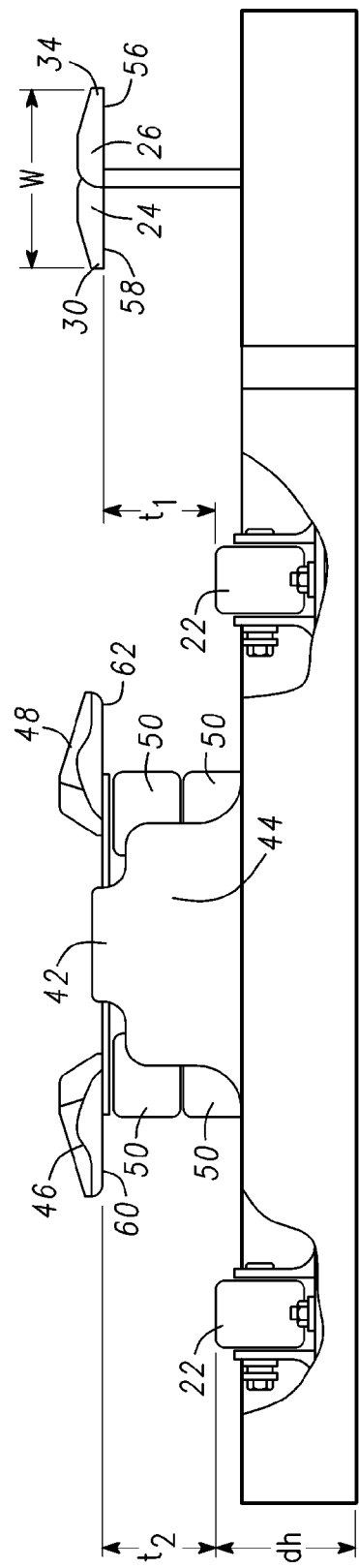
FIG. 6 is an end view of the pallet guide of FIGS. 4-5 with the L-shaped and T-shaped guide members in the deployed position.

With reference to FIGS. 4-6, pallet guide 12 comprises a housing 20, which may be secured to the aircraft cargo deck 10 by any conventional means (e.g., threaded fasteners, rivets, welding, adhesives or other conventional means). In the illustrative embodiment, pallet guide 12 includes a pair of rollers or casters 22 that extend up to the deck height (dh) as shown in FIG. 6 which is the plane defined by the upper surface of the rollers and casters of the linear roller tracks 14 and caster plates 16. Pallet guide 12 further includes first and second guide members 24, 26. As shown in FIG. 5, in the deployed position, guide member 24 has a substantially vertical web portion 28 and a substantially horizontal flange portion 30. Similarly, in the deployed position, guide member 26 has a substantially vertical web portion 32 and a substantially horizontal flange portion 34. Hinges 36, 38 and 40 form a hinged joint between guide member 24 and housing 20 that enables guide member 24 to move from the deployed position as shown in FIG. 5 to the retracted position as shown in FIG. 4. Guide member 26 has a similar hinged joint (not shown) that enables it to move from the deployed position shown in FIG. 5 to the retracted position shown in FIG. 4. A spring-loaded pawl 52 holds guide member 24 against unwanted movement from the deployed condition to the retracted position. A similar pawl (not shown) holds guide member 26 in place Pallet guide 12 further includes a third guide member 42. Third guide member 42 has a substantially T-shaped cross-section comprising a relatively wide vertical web portion 44 and a pair of ears 46, 48 that extend outward from web portion 44 to form the T-shape of guide member 42. The distance ($t_2$) between the deck height and the lower surface 60, 62 of ears 46, 48 is sized to permit the edge of a pallet to be retained between lower surfaces 60, 62 and rollers 22. T-shaped guide member 42 may also include a plurality of horizontal rollers 50 disposed along the lateral edge, which engage the edge of a pallet disposed between guide member 42 and edge guide 18 to enable the pallet to be guided onto and off of aircraft cargo deck 10 with a minimum of effort and a minimum of wear and tear on the pallet and pallet guide.

With reference in particular to FIG. 6, guide member 24 and guide member 26 in the deployed condition cooperate to form a T-shaped guide 54 The distance ($t_1$) between the deck height and the lower surface 56, 58 of flanges 30, 34 is sized to permit a pallet to be retained between rollers 22 and the lower surfaces 56, 58 of guide members 24, 26. Flanges 30, 34 are sized to ensure sufficient overlap with a standard pallet to retain the pallet in flight under all foreseeable conditions. Consequently, the T-shaped guide 54 formed by the cooperation of guide member 24 and guide member 26 has a combined flange width (w) that is greater than the deck height (dh). Because width (w) is greater than the deck height (dh), were T-shaped guide 54 not formed from two L-shaped guides, it would not be possible to retract guide 54 below the level of the deck height.

Figure 2:
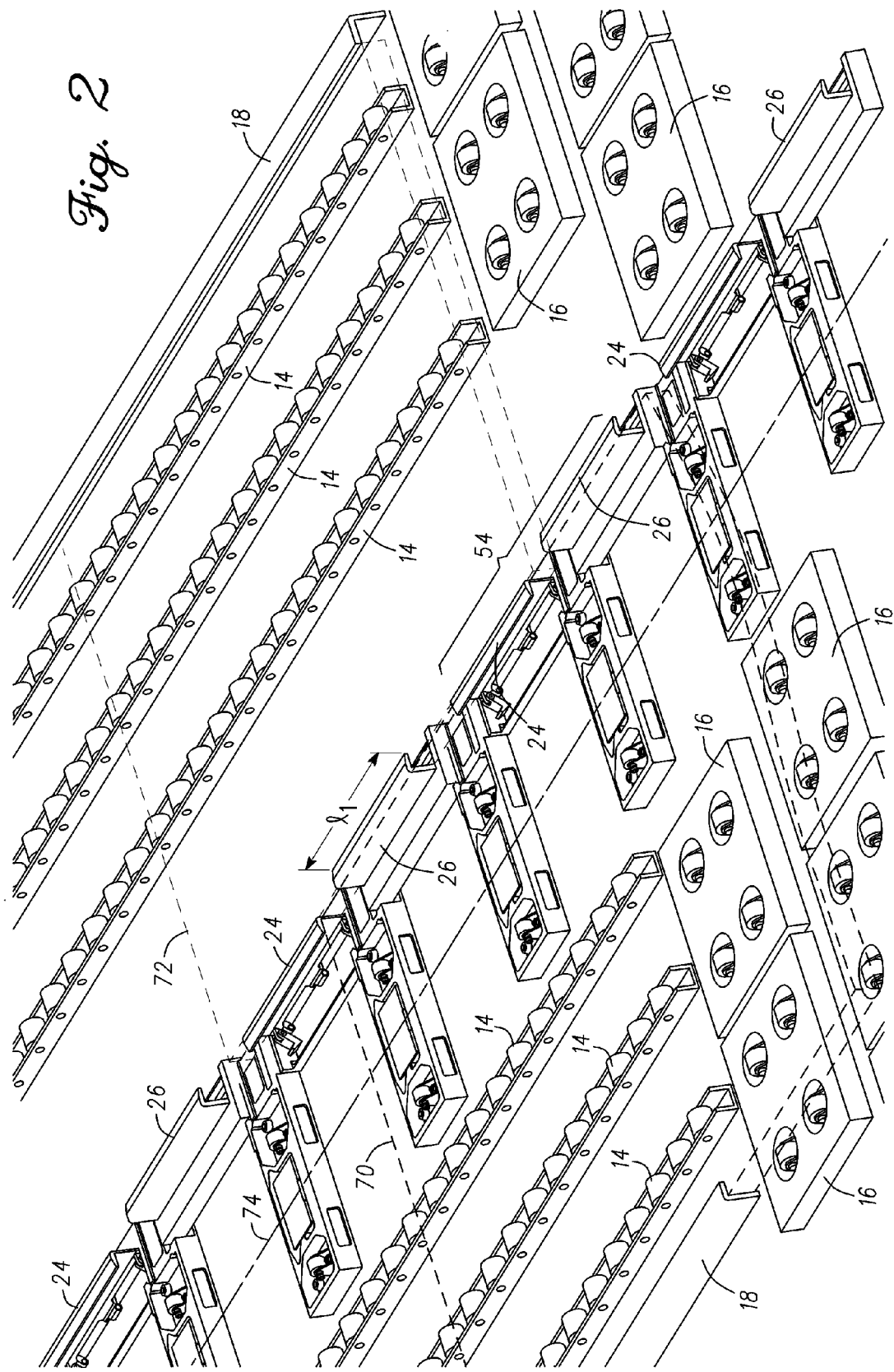
FIG. 2 is perspective view of an aircraft cargo deck having pallet guides incorporating features of the present invention with the L-shaped guide members in their deployed position.

With reference to FIGS. 1 and 2, for loading and securing military 463 L pallets, L-shaped guide members 24 and 26 are moved and locked in their deployed positions while guide members 42 are folded into its retracted position. As noted hereinbefore, the 463 L pellet 64 has castellations comprising a series of notches 66 having a width (c) of a approximately three inches disposed at a pitched distance (p) of approximately fifteen inches. Because of this, guide members 24, 26 must have a length ($l_1$) that is greater than three inches. Because of this, guide members 24, 26 are too long to fold forward below the deck height in a manner similar to T-shaped guide members 42 and for the reasons discussed above would be too wide to fold sideways below the deck height except as complementary L-shaped guides in accordance with the teachings of the present invention.

With particular reference to FIG. 2, as shown by dashed lines 70, 72 because guide members 24, 26 are offset laterally with respect to the centerline 74 of aircraft cargo deck 10, pallets 70 can be loaded with the longitudinal axes of the pallets transverse to the centerline 74 of aircraft cargo deck 10 and pallets 72 can be loaded with the longitudinal axes of the pallets parallel to centerline 74 of aircraft cargo deck 10. The arrangement maximizes the useable interior volume of the aircraft cargo deck 10 which, but for the asymmetric loading, would have a substantial void (e.g., down the center of aircraft cargo deck 10 or along one or more edge or otherwise).

Figure 3:
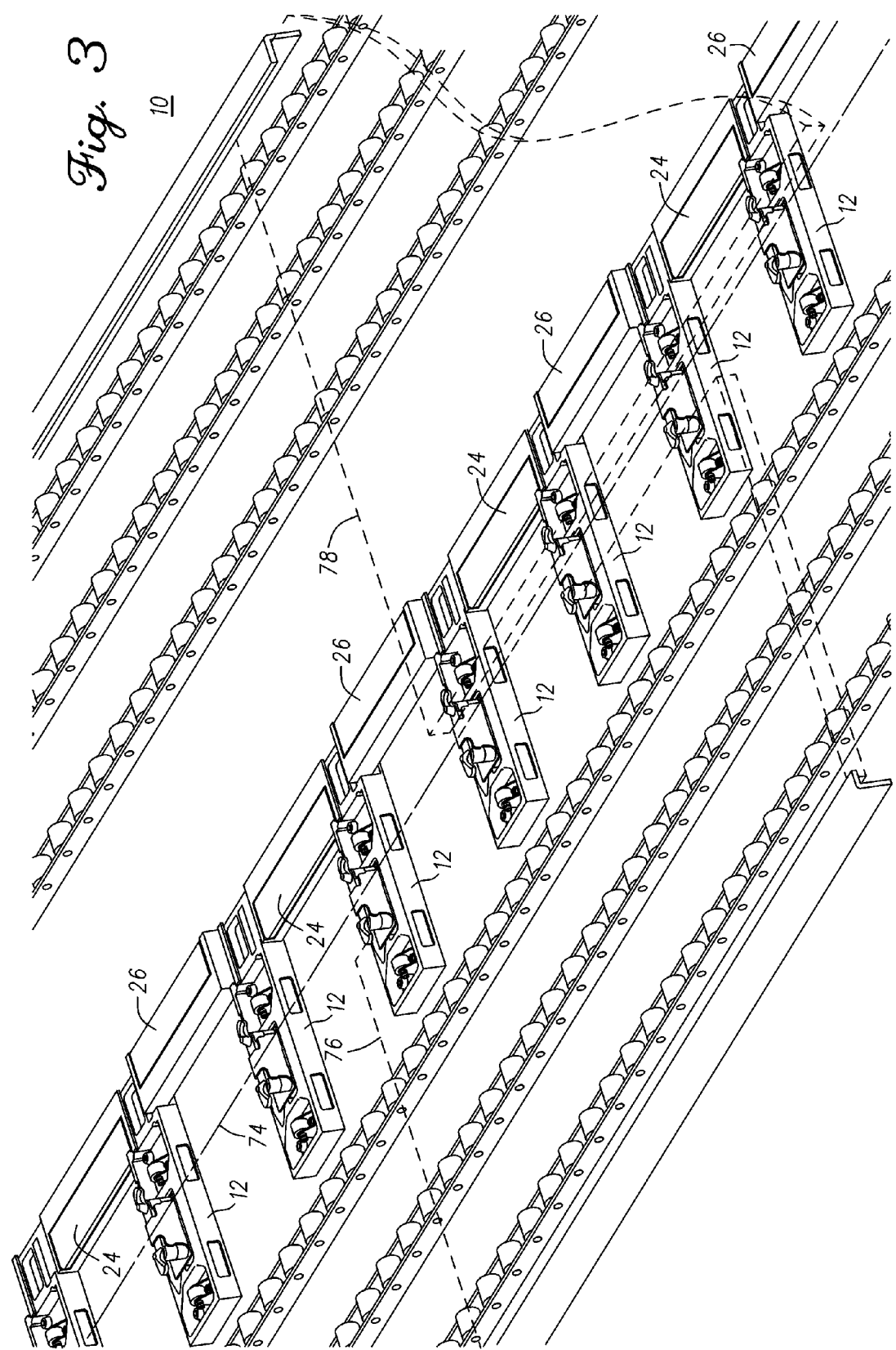
FIG. 3 is perspective view of an aircraft cargo deck having pallet guides incorporating features of the present invention with the L-shaped guide members retracted and the T-shaped guide members deployed.

With reference to FIG. 3, to reconfigure aircraft cargo deck 10 to carry commercial pallets, L-shaped guide members 24 and 26 are moved from the deployed position to the retracted position. As noted hereinbefore, although the combined flange width (w) is greater than the deck height (dh) the width of flanges 30, 34 individually are less than the deck height (dh) consequently, when moved to the retracted position, guide members 24, 26 are below the deck height. Consequently, pallets such as pallets 76 and 78 shown schematically in FIG. 3 move easily over the retracted guide members 24, 26 without interference. Because commercial pallets such as 76 and 78 have smooth sides, the length ($l_2$) (FIG. 4) of guide member 42 can be shorter than the deck height. This enables guide member 42 to fold forward below flush with the deck height in the retracted position yet is fully compatible with commercial pallets 76 and 78 for guiding and restraining the same. Because standard commercial pallets such as the Code M Pallet are both wider and longer than military 463 L pallets, the commercial pallets can be loaded symmetrically with respect to the cargo deck centerline 74 without significant voids.

As can be determined from the foregoing, pallet guides 12 enable an aircraft to be readily configured from carrying military 463 L pallets to commercial pallets and back simply by deploying one set of guides while retracting the other set of guides and, because of the lateral offset of guide members 24 and 26 relative to the centerline of the cargo deck, maximum loading efficiency can be achieved by the asymmetric loading of the military 463L pallets.

Although certain illustrative embodiments and methods have been disclosed herein, it will be apparent from the foregoing disclosure to those skilled in the art that variations and modifications of such embodiments and methods may be made without departing from the invention. For example, although the illustrative embodiment is described in connection with loading and securing flat pallets, nothing herein is intended to limit the present invention to flat pallets. Accordingly, as used herein, the term "pallet" means and refers to closed ULD containers and other closed containers as well as flat pallets). Accordingly, it is intended that the invention should be limited only to the extent required by the appended claims and the rules and principles of applicable law.

What is claimed is:

1. A method of loading and unloading military and civilian pallets from an aircraft having a floor with a roller deck mounted to the floor, the roller deck having a predetermined deck height above the floor, the method comprising:
    providing a pallet guide attached to the floor of the aircraft, the pallet guide comprising a first guide member, the first guide member comprising a structural channel member having a substantially L-shaped cross-section comprising a web portion and a flange portion, the pallet guide further comprising a second guide member, the second guide member also comprising a structural channel member having a substantially L-shaped cross-section comprising a web portion and a flange portion, the first and second guide members being movable from a refracted position in which the first and second guide members are below the predetermined deck height of the roller deck to a deployed position in which the first and second guide members cooperate to form an elongate guide member having a T-shaped cross-section extending above the roller deck when viewed along an axis of the pallet guide; the pallet guide further comprising a third guide member, the third guide member comprising a body having a substantially T-shaped cross section and a thickness dimension measured with respect to the longitudinal axis of the aircraft, the thickness dimension of the third guide member being less than a distance measured from the floor of the aircraft to the predetermined deck height, the third guide member being movable from a retracted position in which the third guide member is below the predetermined deck height of the roller deck, to a deployed position in which the third guide member extends above the roller deck, wherein the step of loading a plurality of pallets of the second configuration onto the aircraft comprises moving the plurality of pallets of the second configuration so that a lower edge of at least one of the plurality of pallets of the second configuration abuts the third guide member;
    providing a plurality of pallets of a first configuration, the pallets of the first configuration each having a lower edge with a castellated perimeter;
    loading the plurality of pallets of the first configuration onto the aircraft so that the lower edge of at least one of the pallets of the first configuration abuts at least one of the guide members;
    unloading the plurality of pallets of the first configuration from the aircraft;
    moving the first and second guide members from the deployed position to the retracted position;
    providing a plurality of pallets of a second configuration, the pallets of the second configuration each having a substantially straight lower edge; and
    loading a plurality of pallets of the second configuration onto the aircraft.

2. The method of claim 1, wherein:
    the T-shaped cross section of the elongate guide member includes a horizontal flange having a width dimension, the width dimension of the horizontal flange being greater than a distance measured from the floor of the aircraft to the predetermined deck height.

3. The method of claim 1, wherein:
    the plurality of notches formed in the lower edge of the pallets of the first configuration are spaced apart by a distance defining a first pitch; and
    the first and second guide members each have a longitudinal dimension greater than the first pitch,
    whereby the notches formed in the lower edge of the pallets of the first configuration pallets cannot catch on the first and second guide members as the pallets of the first configuration are guided by the pallet guide.

4. The method of claim 1, wherein:
    the first and second guide members are staggered longitudinally with respect to a longitudinal axis of the aircraft.

5. The method of claim 1, wherein:
    the first and second guide members are moved from the retracted to the deployed position by pivoting each of the first and second guide members about a longitudinal axis proximal lower edge of the web portions of each of the first and second guide members.

6. The method of claim 1, further comprising:
    sliding a lower surface of a pallet of the second configuration over the first and second guide members in the retracted position.

* * * * *